United States Patent [19]

Pilloff

[11] 4,016,500
[45] Apr. 5, 1977

[54] EXPLOSIVELY DRIVEN LASER AMPLIFIER SYSTEM

[75] Inventor: Herschel S. Pilloff, Oxon Hill, Md.

[73] Assignee: The United States of America as represented by the Secretary of the Navy, Washington, D.C.

[22] Filed: Oct. 17, 1975

[21] Appl. No.: 623,278

[52] U.S. Cl. .......................... 330/4.3; 331/94.5 P; 331/94.5 L
[51] Int. Cl.$^2$ .................... H01S 3/091; H01S 3/20
[58] Field of Search ................ 330/4.3; 331/94.5 P, 331/94.5 L; 315/145–147

[56] References Cited

UNITED STATES PATENTS

| 3,235,816 | 2/1966 | Wanlass | 330/4.3 |
|---|---|---|---|
| 3,271,696 | 9/1966 | De Ment | 330/4.3 |
| 3,451,008 | 6/1969 | Dunne | 331/94.5 |
| 3,453,558 | 7/1969 | Abegg et al. | 331/94.5 P |
| 3,538,455 | 11/1970 | Florio | 331/94.5 P |
| 3,681,252 | 8/1972 | Breher et al. | 331/94.5 L |
| 3,914,709 | 10/1975 | Pike | 330/4.3 |
| 3,931,594 | 1/1976 | Schafer | 331/94.5 L |

OTHER PUBLICATIONS

Aisenberg, "The Study of Infrared Molecular Gas Lasers," 11/72, pp. 1–5, 50–54.

Primary Examiner—Nelson Moskowitz
Attorney, Agent, or Firm—R. S. Sciascia; Philip Schneider; Melvin L. Crane

[57] ABSTRACT

A system for optically coupling an intense photon output from an explosively shock-heated gas to a laser amplifier for the generation of a very high power optical pulse. A laser amplifier element preferably a dye laser type is centrally located within and supported by an enclosed hexahedron housing filled with a visible or infrared absorbing solution. Each leg of the hexahedron has secured thereto a pyramidal shaped (a pyramid with the apex end cut off parallel with the base) gas filled lamp for pumping the laser amplifier element. Each gas lamp is provided with a liner of explosive material along the inside of the outermost surface which is ignited by an electrical detonator. Detonation of the explosive liner produces an imploding shock wave which raises the argon gas to incandescence to excite the liquid dye laser amplifier to produce a population inversion necessary for laser amplification.

3 Claims, 2 Drawing Figures

EXPLOSIVELY DRIVEN LASER AMPLIFIER SYSTEM

BACKGROUND OF THE INVENTION

This invention relates to laser amplifiers and more particularly to a laser amplifier for generating a very high energy, very high power optical pulse.

Heretofore high temperature physics devices have used explosive liners or inner surfaces which create an inwardly directed high velocity wave for fusion research leading to production of thermonuclear energy. Such prior art U.S. patents Nos. are 3,152,958, 3,489,645 and 3,378,446. Also laser elements have been pumped by use of shock waves, such art comprising patents are 3,407,362 and 3,451,008.

SUMMARY OF THE INVENTION

This invention amplifies a laser pulse to a very high energy, very high power optical pulse by simultaneously exploding a plurality of sheets of explosive material assembled about a laser amplifier which causes an explosion thereby compressing a noble gas surrounding the amplifier to produce highly intense light. The light produced excites a centrally located rhodamine 6G solution with suitable triplet state quenchers within a pyrex tube. The light so amplified is useful for an output optical radiation beam.

DETAILED DESCRIPTION OF THE DRAWINGS

Figure 1:
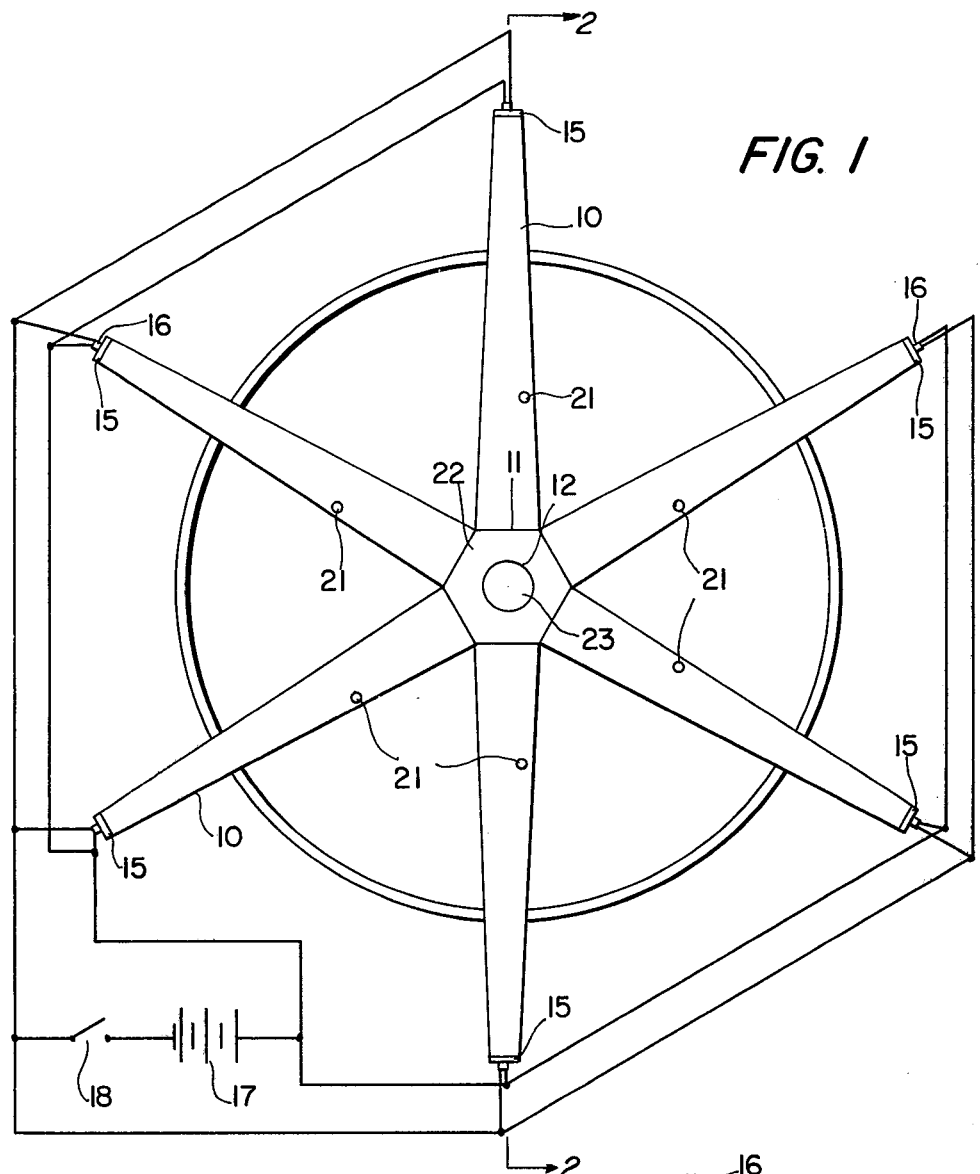
FIG. 1 illustrates a cross-sectional view of the device perpendicular to the longitudinal axis.
Figure 2:
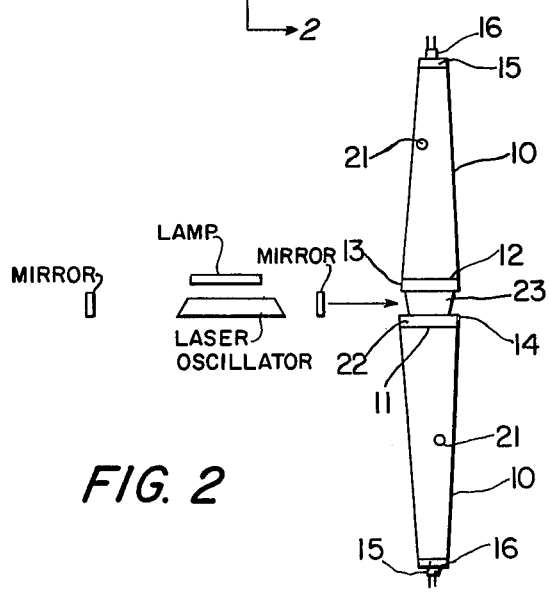
FIG. 2 illustrates a cross-sectional view along the length of the device.

Now referring to FIGS. 1 and 2 there is shown by illustration a laser amplifier device made in accordance with the teaching of this invention. As shown, the device includes a plurality of pyramidal shaped "explosive" type lamp 10 each of which are arranged with the one base thereof secured to an equal length side of a hexahedron shaped housing 11. A cylindrical shaped fluid laser amplifier 12 is centrally located within the hexahedron housing and supported at its ends by end enclosures 13, 14 which enclose the hexagon housing. The laser amplifier element is shown with windows at Brewster's angle which are well known in the art. Each of the pyramidal shaped lamps include a layer or sheet of an explosive material 15 on the inside surface of the outer end which is detonated by a detonator 16 by use of a suitable electrical source 17 through control switch 18. The lamps are filled with a noble gas 21 such as argon, krypton, or xenon at a pressure of about one atmosphere. The hexahedron housing contains therein, surrounding the laser element, an aquous solution 22 containing appropriate filter solutions such as $NiSO_4$ for absorbing visible and infrared radiation; that is, radiation of wavelengths which would be absorbed by the laser solution and which is not effective in pumping the amplifier due to heating of the laser solution. The dye laser includes therein a dye solution 23 such as an aquous $10^{-4}$ M Rhodamine 6G which contains appropriate triplet state quenchers such as soap or cyclooctatetraene or any other quenchers well known in the art.

As an example of completing an operating system, the lamps may be 100 cm in height with the base having a 20–30 cm length, and a width equal to one side of the hexahedron housing with the outer end of the lamp of less length and width than the inner end. The sides of the lamp may be cardboard with the inner surface thereof coated with almuniized mylar. The outer end of each lamp is lined with a layer containing about 2/3 kg of explosive material such as composition B, C–3, C–4; plastic bonded HMX or plastic bonded PETN. The explosive material on the inner surface of the outer end of each lamp is of the same weight and each lamp is filled with about 1–5% by weight of the explosive material with argon, krypton or xenon at a pressure of about one atmosphere. The hexahedron housing is of a length equal to the width of the lamps. The laser amplifier element has a diameter of 6 cm and is slightly shorter in length than the hexahedron housing with the ends supported by the end window enclosures of the housing. The laser amplifier element and hexahedron housing are made of pyrex or any other suitable material that will contain the visible and infrared radiation heat absorbing or filtering solution surrounding the laser element and the dye solution within the laser amplifier.

Closing switch 18 simultaneously energizes all detonators 16 thereby causing each of the high explosive liners to explode. On exploding, the explosion is confined within the housing causing an implosion or inwardly-traveling strong shock wave. As the shock wave travels toward the axis of the housing, the argon gas is heated to incandescence or a temperature of 30,000° K or greater. The light so produced excites the dye solution within the laser amplifier thereby serving as a laser amplifier. The heat absorbing filter solution surrounding the dye laser amplifier, filters out the visible and infrared radiation to prevent unnecessary heating of the laser amplifier. The shock wave continues to the axis imploding the central hexahedron housing and amplifier element thereby destroying the housing and amplifier subsequent to amplification of an output beam.

In carrying out this invention the explosive material produces an imploding shock wave that heats the gas such as argon to a temperature of 30,000° K or more. The photons produced excites the dye to produce a laser amplifier which amplifies an output from a laser oscillator incident on the dye laser amplifier. In obtaining high energies from a single pulse laser amplifier it is necessary to have either very large inversion densities or alternatively, very fast relaxation such that the amplifier is operated in the quasi-continuous wave regime. If neither of these conditions are satified, the pump will saturate the amplifier media. The second condition is satisfied by the dye laser amplifier where typical relaxation times are approximately $10^{-9}$ seconds. In the present system the argon gas imploding shock wave pumps the amplifier for 100 microseconds before it is destroyed by the shock wave.

Since the argon gas imploding shock wave pumps the amplifier for a hundred microseconds, each single dye molecule in the amplifier media will undergo many absorption and subsequent stimulated emission processes. Since the dye media has a very fast relaxation time, optimum coupling is allowed between the relatively long duration explosive light source and the very fast relaxing dye laser amplifier system. Thus, the amplifier effectively utilizes the full intensity of the shock wave without incoherently saturating, or becoming transparent.

Explosively pumped dye laser amplifiers make it possible to achieve previously unobtainable combinations of power and energy from a laser system. Specific features include very fast turn on time, wavelength tunability, comparatively inexpensive materials, it is lightweight, relatively simple and uses non-toxic materials.

In carrying out this invention, the intense broadband emission from an explosively shocked gas is used to optimally pump a dye laser amplifier having broadband absorption and very fast relaxation such that the amplifier is operated in the quasi-stationary mode; i.e., the population inversion and the amplification coefficient follow the intensity in a quasi-stationary way.

High explosives provide the cheapest, most compact, and lightest weight, source of high power and energy available today. It has been determined that a single stage dye laser amplifier will give $5 \times 10^3$ joules at $50 \times 10^6$ watts and a second stage will further increase values to $20 \times 10^3$ joules at $200 \times 10^6$ watts.

In making use of the above described laser amplifier, an output beam from laser oscillator is directed onto one end of the laser amplifier. The laser beam is then amplified by operation of the laser amplifier of this invention.

Obviously many modifications and variations of the present invention are possible in light of the above teachings. It is therefore to be understood that within the scope of the appended claims the invention may be practiced otherwise than as specifically described.

What is claimed and deseved to be secured by letters patent of the United States is:

1. An explosively excited laser amplifier which comprises:

a housing formed of radiation-transparent material in the shape of a hexahedron;

a fluid-type laser amplifier cell supported coaxially within said housing;

a radiation-absorbing fluid within said housing and surrounding said fluid-laser amplifier cell for absorbing visible and infrared radiation of wavelengths which are not effective in pumping said amplifier due to heating of fluid in said laser amplifier cell;

a plurality of equally spaced, radially extending, pyramidally shaped, laser excitation lamps, each secured at its base end to one side of said hexagonal-shaped housing with the length and width of its base equal that of the length and width of the face of said housing to which it is secured, each of said pyramidal-shaped lamps having its apex end cut off and enclosed by an outer end surface;

a liner of explosive material on the inner surface of the apex end of each of said radially extending, laser excitation lamps;

a noble gaseous medium filling the volume of each of said pyramidal-shaped, laser excitation lamps between said housing and said liner of explosive material on the inner surface of the outer end thereof; and means for simultaneously detonating said liner of explosive material in each of said laser lamps.

2. An explosively excited laser amplifier as claimed in claim 1, wherein;

said radiation absorption fluid in said housing in $NiSO_4$ solution.

3. An explosively excited laser amplifier as claimed in claim 1, wherein;

said fluid laser amplifier cell includes an aqueous $10^{-4}$ M Rhodamine 6G solution therein.

* * * * *